United States Patent Office 3,634,250
Patented Jan. 11, 1972

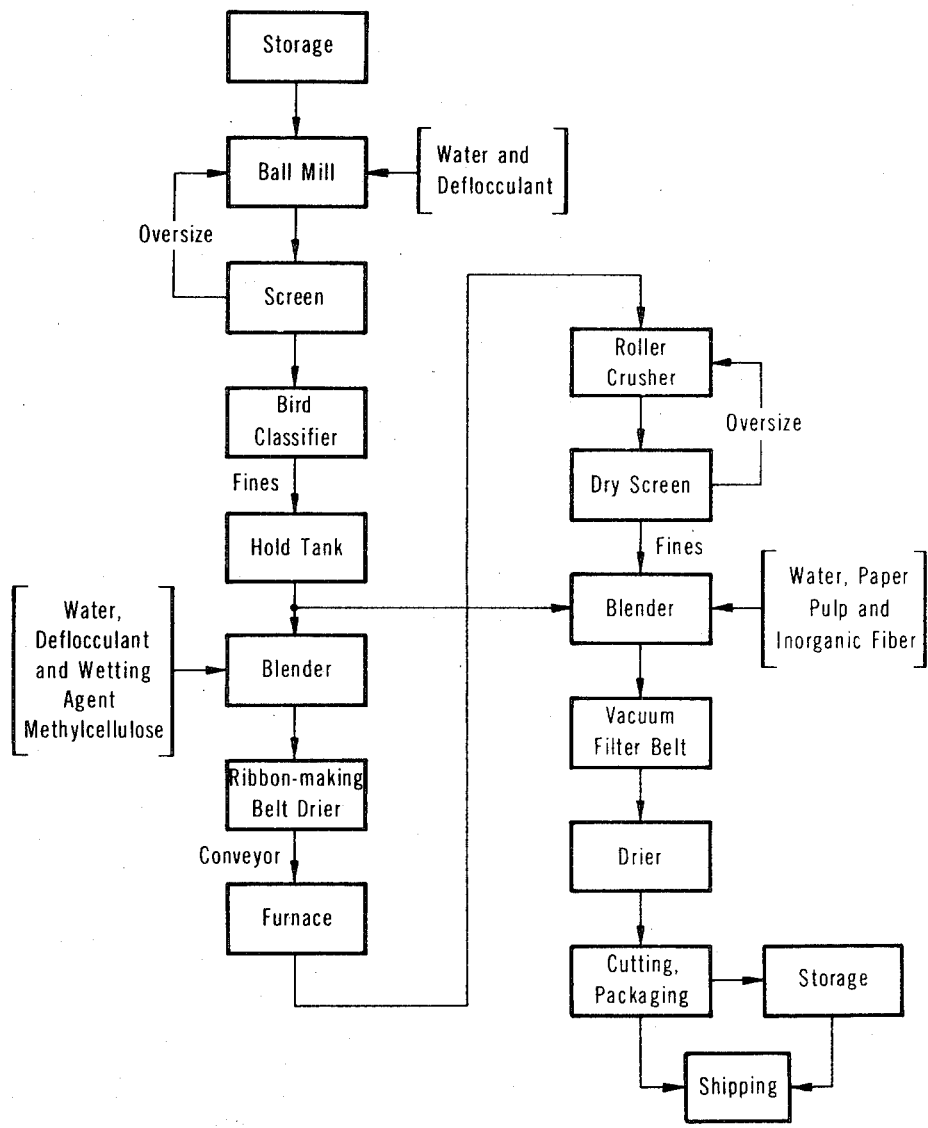

3,634,250
PROCESS OF MAKING THERMAL INSULATION
Charles H. Commons, Jr., Clearwater, Fla., assignor to the United States of America as represented by the Secretary of Commerce
Filed Apr. 29, 1969, Ser. No. 820,257
Int. Cl. F16l 59/00; C04b 43/12; B28c 3/00
U.S. Cl. 252—62
3 Claims

ABSTRACT OF THE DISCLOSURE

A thermal insulation prepared by casting onto a support, a suspension containing finely divided fireclay and an organic film forming agent, drying the cast suspension to provide a flexible, self-supporting film, and firing the film to burn out the film forming agent. The fired film may be crushed to produce a finely divided thermal insulating material, and the finely divided material may be fabricated, along with a fibrous organic binder, into a flexible, light-weight, refractory, insulating mat or blanket.

FIELD OF INVENTION

The invention described herein was made in the course of work under Contract No. C-270-66 (Neg) between Spindletop Research, Inc., and the United States Department of Commerce. Spindletop Research, Inc., has the right to grant exclusive license(s) under this application and the resulting patent during a period starting with the filing date of this application and extending three (3) years from the date of issue of the patent. The three-year period may be extended by the Department of Commerce. The right to grant exclusive license(s) is subject to the "march-in-rights" clause set forth in Section 1(g) of the "Presidential Memorandum and Statement of Government Patent Policy" issued Oct. 10, 1963 (28 F. R. 10943, Oct. 12, 1963).

The present invention is directed to a thermal insulating material prepared from fireclay and to a flexible film, containing finely divided fireclay, useful in preparing a thermal insulating material. The present invention is also directed to a flexible, light-weight, refractory, thermal insulating mat or felt and a process of preparing such a mat.

BACKGROUND OF INVENTION

Throughout the United States, there are large deposits of refractory clays. An example of such a deposit is the Olive Hill clay bed located in eastern Kentucky. As recently as the early 1950's, such clay deposits were mined relatively extensively to provide raw materials used in producing refractory products. During the early 1950's, the railroads converted from coal-fired engines to diesel units and steel mills began to use basic refractories, substantially reducing the market for fireclay bricks. As a result, virtually unlimited clay deposits are going unused. A potential market exists for such clays as thermal insulation, providing that they could be converted into a form which would compete effectively with commercially available inorganic fibrous insulating material.

Although there is some overlap, the temperature spectrum of thermal insulation can be roughly divided into five zones—cryogenic, moderate, intermediate, high, and very high. The cryogenic zone extends down to near absolute zero. The moderate zone usually encompasses the range from about —40° F. to temperatures approaching 900° F. Temperatures from about 900° F. to 1800° F., and occasionally to nearly 2000° F., are generally considered the intermediate zone. From 1800° F. to 3000° F. is considered the high temperature zone, while temperatures above 3000° F. are considered in the very high temperature zone.

Commercially available inorganic fibrous insulating material, particularly that of alumina-silicate glass of kaolin to mullite composition, is commonly used as an insulating material in the intermediate and lower part of the high temperature zones, as well as in the cryogenic zone.

PRIOR ART

One type of alumina-silicate fibrous insulating material, sold under the brand name Kaowool, is made from purified kaolin clay. Another type of alumina-silicate fibrous insulating material, sold under the brand name Fiberfrax, consists of 45 to 55% by weight alumina and 55 to 45% silica. Fibers are made by striking a molten stream at a right angle with a jet of air or steam. The orifice diameter and the air of steam pressure determines the fiber diameter and length. The preferred fibers range from one to ten microns in diameter and are at least 0.5 inch in length.

The commercially available alumina-silicate fibrous insulating materials are useful up to temperatures of 2300° F. At higher temperatures, the material softens enough to compact and lose its insulating properties. It would obviously be desirable to increase the refractoriness, and thus increase the useful temperature range, of alumina-silicate fibers. One method of increasing refractoriness is to increase the alumina content. However, if the alumina content of the molten composition is increased above about 55%, pellets, rather than fibers, are formed when the molten material is subjected to the usual fiberizing treatment. It is thus impractical to improve the refractoriness of the "spun" commercially available alumina-silicate fibers.

The refractoriness of insulating materials made from fireclays in accordance with the present invention can be improved merely by adding alumina during production. In addition, insulating materials made in accordance with the present invention have at least as good insulating properties as commercially available alumina-silicate fibers in the intermediate zone and superior insulating properties in the high temperature zone. Furthermore, insulating materials in accordance with the present invention, even absent additional alumina, can be used at temperatures approximately 400° higher than commercially available alumina-silicate fibers.

SUMMARY OF INVENTION

A flexible film may be prepared by incorporating into a slurry of finely divided fireclay, an organic film forming agent. The resultant mixture is cast onto a smooth substrate and dried at a temperature below that at which the film forming agent will be burned out. The product, after removal from the substrate, is a coherent, self-supporting, flexible film, capable of being fired whereby the organic film forming agent is burned out and a refractory insulating material is formed. After firing, the film has little flexibility and is preferably crushed prior to use.

The crushed material may be blended with from about 3% to 15% by weight of a fibrous organic binder to produce a flexible, light-weight, refractory, thermal insulating felt or mat. Up to 10% by weight of alumina-silicate fiber and up to 32% by weight of finely divided fireclay may also be incorporated into the insulating mat.

DESCRIPTION OF DRAWING

The flow sheet of the drawing represents one embodiment of the present invention. Fireclay would be delivered to a plant storage shed and weighed charges would be fed to a ball mill along with water and a deflocculant. The discharge from the ball mill is screened to remove balls and any lumps before being diluted with water and passed to a high speed horizontal centrifugal Bird type classifier.

In the classifier, particles over two microns in size are separated out and the fines are pumped to a holding tank. The oversize material from both the screening and classifying operations may be remilled or discarded. Periodically, the oversize should be discarded to avoid a buildup of quartz.

From the holding tank, the slurry is fed to a blender where it is diluted with additional water, and a film forming agent, such as methylcellulose, a wetting agent, and additional deflocculant (if necessary) are added. After blending, the slurry could be pumped to a holding tank to allow air to work out before feeding to the belt dryer.

The blend is applied to an endless belt drier, preferably in the form of several thin strips or ribbons. Preferably, the belt is of a metallic sheet, such as aluminum, which passes over a steel drum heated to approximately 300° F. The dried strips or ribbons are removed from the belt drier and conveyed to the furnace. Suitable firing can be accomplished at 2500 to 2730° F. for a residence time of two to five minutes. Prior to firing, the ribbons may be collected on a conveyor belt which travels through a furnace heated to about 1400° F. to burn out the carbonaceous materials.

The fired strips or ribbons are cooled and sent to a roller crusher. A screen passes the fines to a weighing hopper and returns the oversize particles for further crushing. The fines from crushing are useful in many insulating applications. A preferred use is to incorporate the fines into a flexible insulating blanket.

An insulating blanket can be prepared by blending the crushed fines with a fibrous organic binder, such as paper pulp. Alumina-silicate fiber and fireclay, in the form of the clay slurry from the Bird type classifier, can also be added to the blend. After mixing, the materials are discharged onto an endless belt where they are conducted over a vacuum filter and through a drier. The output of the drier is a flexible, light-weight, refractory thermal insulating mat which can be cut to convenient sizes, packed, and shipped or sent to storage.

DETAILED DESCRIPTION OF THE INVENTION

Any of the varieties of commonly occurring fireclay are suitable for use in the present invention. Fireclays contain only a small amount of fluxing impurities and are high in silica, alumina, and water content. Such clays are capable of withstanding high temperatures, fire to a light color (ranging from grey to yellowish-red), and exhibit wide variations in both chemical and physical properties.

Fireclays are usually grouped as "plastic" or "flint." Clays having properties intermediate to the two are usually referred to as either "semi-plastic" or "semi-flint."

The plastic clays are usually distinguished by a lower ratio of alumina to silica than flint clays and generally have a higher percentage of impurities together with a lower fusion point. Flint clays are harder and more highly refractory than plastic clays. Semi-plastic or semi-flint clays often possess a high degree of refractoriness, sometimes approaching that of the flint clays.

In typical raw fireclays, the major mineral is kaolinite, a hydrated aluminum silicate. Quartz is present as a minor mineral ingredient. In relative terms, there is a small amount of quartz in the flint clay, a somewhat greater amount in the semi-flint clay, and approximately twice as much quartz in the plastic clay as in the semi-flint clay.

In the production of refractory shapes, it is generally considered necessary to use an appreciable amount of the less refractory plastic clay in admixture with the flint clay to obtain the necessary working properties. In accordance with the present invention, it is not necessary to blend the clays; therefore, the use of flint clay alone, because it is more refractory, is preferred.

In preparing a slip or slurry from a clay sample, the clay is first milled using techniques well known in the art. One method is to ball mill the clay in water suspension using a high density porcelain media. A typical ball mill charge consists of 1500 grams of clay, 1500 grams of water, and 0.225 gram of a deflocculant such as Darvan C.

When as-milled clay was used to produce films, it was found that the fired product contained both mullite and cristobalite. Cristobalite is produced in the fired product from quartz present in the raw clay, while mullite is produced from the kaolinite. Since cristobalite has a very high coefficient of thermal expansion and mullite has a low coefficient of thermal expansion, it is desirable, from a durability standpoint, to eliminate the cristobalite. It was found that the particle size of the quartz is not reduced as rapidly during milling as is the kaolinite. Thus it was possible to substantially eliminate cristobalite in the finished product by milling the raw clay for only limited amounts of time and removing the material coarser than two microns from the milled clay. Determination of optimum milling conditions, with respect to length of milling time, mill charge, etc., to obtain maximum elimination of quartz and the most economical operation, may readily be determined by one skilled in the art.

After milling, additional water is added to the slurry to make it fluid enough to spread as a thin film and a small amount of a deflocculant, such as sodium hexametaphosphate, is added to complete defloculation, if necessary. The slurry may be allowed to stand for a sufficient time to allow the particles in excess of two microns in size to settle. After removal of the oversize particles, either by settling or mechanical centrifuging, the slurry is admixed with the film forming agent. The preferred film forming agent is methylcellulose, but other film forming agents such as Carbopol, ammonium alginate, etc., can be used. The addition of a film forming agent allows the efficient formation of thin films.

The composition of the slurry may be varied over a relatively large range, depending upon a number of factors. For example, if it is desirable to cast very thin films, the amount of film forming agent present should be increased. Suitable slurries for casting thin films comprise from about 1% to about 8% by weight film forming agent and from about 92% to about 99% by weight finely divided fireclay (based on the combined weight of the fireclay and the film forming agent). Preferably the slurry has a specific gravity between 1.07 and 1.18. Generally, any slurry fluid enough to cast readily and containing a sufficient amount of film forming agent so that a film will form when the slurry is cast upon a smooth substrate, is suitable.

It has been found that better films are formed if a small amount of a wetting agent (such as Triton X) is added to the slurry. The dried films release from the substrate, and the life of the substrate is extended, if a small amount of oleic acid is added to the slurry.

A specific slurry mix found to be suitable for casting thin films had a specific gravity of 1.1 and contained 93.82% ball milled flint fireclay having a particle size of less than two microns, 6.0% methylcellulose (added as a five percent solution in water), 0.15% deflocculant (Darvan C), 0.02% wetting agent (Triton X), and 0.015% oleic acid (all percentages by weight based on the total weight of all the slurry ingredients other than water).

After incorporating the film forming agent into the slurry, a thin film of the slurry is flowed onto a smooth substrate such as plastic, glass, paper, or metal sheet. When non-wetting surfaces such as Mylar or Teflon are used, a wetting agent should be added to the slurry. Metallic sheets, and particularly aluminum, are the preferred substrate. Aluminum alloys the wet film to spread to a uniform thickness and releases the film readily when dry. The useful life of the aluminum substrate is extended if, in addition to inclusion of a minor amount of oleic acid in the slurry, the aluminum is coated with a light application of lard oil. Drying can be accomplished at any temperature high enough to drive off the water, and low enough so that the film forming agent isn't degraded. However, it is beneficial, with respect to extending the useful life of the substrate, if it is not heated above 300° F. during the drying cycle. It is believed that temperatures above 300° F. cause oxidation of the surface and promote sticking of the film to the aluminum sheet. The substrate should also be kept as smooth as possible, as the dried films tend to adhere more firmly to scratched surfaces. Other preferred substrates include smooth and polished sheets of metals and alloys such as stainless steel, bronze, etc.; composite or coated sheets can of course also be used.

Preferably, the slurry is applied to an endless belt of metallic foil which passes over a heated steel drum, in the form of parallel, relatively narrow (e.g., ¼ to ½ inch) bands or ribbons. After drying, the ribbons may be removed from the substrate; the dried ribbons are flexible, self-supporting, and have little tendency to stick together.

The slurry is applied at a rate to produce films varying in thickness from 0.1 mil to several mils. While thin films are preferred, if the slurry is applied at a rate to produce films less than 0.1 mil thick, there is a tendency for the films to stick to the substrate. Several factors affect the obtainable film thickness, such as the amount of film forming agent employed, previously mentioned. The more dilute the slurry, and the finer the clay particles, the thinner the film which may be cast. In all cases, regardless of the slurry makeup, there is a minimum thickness which can be removed from the substrate. Below this minimum thickness, the film acts like a paint film and has to be washed or scraped from the substrate surface.

The dried films may be placed directly into a furnace and fired. Firing can take place over a wide temperature range, with longer times required, of course, at lower temperatures. A suitable range for firing is about 2350° F. to about 2730° F. Preferably the film is fired at about 2500 to 2730° F. at these temperatures, a residence time of about two to five minutes is adequate. In addition, the ribbons may be first heated to a temperature of about 1400° F. for three or four minutes to burn out the carbonaceous material before firing at a higher temperature.

Fired films are very translucent and have little flexibility. Upon firing, cast ribbons exhibit substantial shrinkage in the length and width of the ribbons, but thickness is 30 to 50% greater after firing than before. This may be due in part to the fact that the fired ribbons tend to not be flat but to have a corrugated appearance when examined from the end. The fired ribbons have a low bulk density (less than 0.008 gram per cubic centimeter).

The fired ribbons are useable as an insulating material in this form, however, they are not readily handleable and it is therefore preferred to crush them prior to use. When crushed through a one-half inch screen, the material coarser than six mesh has a bulk density of 0.046 gram per cubic centimeter while the fines (less than six mesh) have a density of 0.0616 gram per cubic centimeter. Thermal conductivity tests show that packed fines have a better insulating value than the loosely packed material and that the very loosely packed bulk material is not as good an insulator as tightly packed fines. However, if a major portion of the crushed material is too fine, it may pack too densely. In view of this, it is preferred to crush the fired ribbons to a size of less than about 6 mesh, but greater than about 100 mesh. Crushing can be accomplished using any number of well-known crushing devices; a roller crusher is preferred.

The product obtained after crushing and sizing is useful for many insulating applications, such as loose insulating fill for roofs and walls of furnaces, tunnel kilns, muffles, etc., and as a reinforcing additive for plastics and resins to permit useage at elevated temperatures.

The refractoriness of the fired fireclay product may be increased by merely adding alumina to the slurry prior to casting. Up to 50% of the clay of the slurry may be replaced with powdered alumina. Suitable alumina powder has a particle size between about 0.5 micron and about 5.0 microns. Typical of such alumina powder is that sold as Grade RC2 GF by Reynolds Company. Ribbons prepared from such mixtures form as easily and release from the substrate as well as those made from clays alone. When fired, the ribbons have similar properties to those in which no alumina has been added, except that the alumina-containing ribbons are substantially more refractory, whiter, and more opaque than the all-clay ribbons.

The crushed fired fireclay can advantageously be incorporated into a flexible insulating mat or blanket. A slurry of crushed fired fireclay and 3 to 15% by weight of a fibrous organic binder, based on the dry weight of the clay and the binder are prepared and discharged onto an endless belt. The belt carries the mixture over a vacuum filter and through a drier. The resultant product is a flexible, light-weight, refractory, thermal insulating mat which can be installed as sheets or blankets, or can be rewet and remolded to nearly any desired shape with very little shrinkage upon drying and firing. The insulating mats do not appear to soften when heated to temperatures as high as 2730° F.

As a specific example, 85% by weight finely divided fired fireclay and 15% by weight paper pulp based on the dry weight of the powder and the paper were blended with ten times their weight of water. The material was formed into a mat by draining through a vacuum filter and dried. The resultant felt had good body and handling properties. When the mat was subjected to a flame, the product charred and glowed red for a few seconds after the heat was removed. Mats cointaining lesser amount of paper pulp, i.e., 7½% by dry weight, oxidized only while subjected to flame and ceased burning as soon as the flame was removed.

Up to 10% by weight of an inorganic alumina-silicate fiber having a diameter in the range from one to ten microns and a fiber length of 0.5 inch or longer, such as that sold under the trade name Fiberfrax, may be added to the mat. In addition, up to 32% by weight of non-fired fireclay can also be added to the mat. Relatively large additions of clay improved the strength of the mat after firing, but also increased its density. At some point, the increased density will lower the thermal insulation value. To insure adequate insulating properties, the mat should include at least 65% by weight crushed fired fireclay.

A mat comprises 78.3% by weight fines from pulverized fired films, 4.3% by weight paper pulp, 4.3% by weight alumina-silicate fibers (Fiberfrax), and 13% by weight fireclay having a particle size less than two microns, was found to make an excellent insulating blanket.

In fabricating mats the unfired fireclay is preferably added in the form of the same slurry used to prepare the flexible films. Various auxiliary organic binders can also be used if desired. For example, rosin, preferably as a solution in an organic liquid, can be added to the slurry from which the mat is prepared if it is desired to decrease the specific gravity of the mat and thus obtain a softer more flexible mat.

What is claimed is:
1. A process comprising:
  (A) Casting on a smooth substrate, an aqueous slurry of finely divided fireclay having a particle size of less than two microns and a sufficient amount of an organic film forming agent so that a film will be formed when said slurry is cast upon said smooth substrate,
  (B) Drying said dispersion while on said substrate at a temperature below that at which said film forming agent will be burned out, whereby a flexible, self-supporting film capable of being fired to form a thermal insulating material is formed,
  (C) Removing said film from said substrate and firing said film whereby said organic film forming agent is burned out and a refractory thermal insulating material is formed, and (D) Crushing the fired film to produce a finely divided thermal insulating material.

2. The process of claim 1 in which the fired film is crushed to a particle size of less than about six mesh.

3. The process of claim 2 which includes the additional step of blending said finely divided thermal insulating material with between about 3% by weight and about 15% by weight of a fibrous organic binder to produce a flexible, light-weight, refractory, thermal insulating mat.

References Cited

UNITED STATES PATENTS

| | | | |
|---|---|---|---|
| 1,723,989 | 8/1929 | Balduf | 252—62 |
| 2,524,601 | 10/1950 | Riddle | 252—62 X |
| 2,586,726 | 2/1952 | Schuetz et al. | 162—153 |
| 2,676,892 | 4/1954 | McLaughlin | 106—86 |

HAROLD ANSHER, Primary Examiner

U.S. Cl. X.R.

156—89, 155, 246; 161—165, 168, 169; 241—4